United States Patent
Kobayashi et al.

(10) Patent No.: US 11,054,821 B2
(45) Date of Patent: Jul. 6, 2021

(54) REMOTE-OPERATION APPARATUS AND REMOTE-OPERATION METHOD

(71) Applicant: Panasonic Intellectual Property Management Co., Ltd., Osaka (JP)

(72) Inventors: Norihiko Kobayashi, Tokyo (JP); Junichi Sakai, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 163 days.

(21) Appl. No.: 16/452,578

(22) Filed: Jun. 26, 2019

(65) Prior Publication Data

US 2019/0317491 A1 Oct. 17, 2019

Related U.S. Application Data

(63) Continuation of application No. PCT/JP2018/005426, filed on Feb. 16, 2018.

(30) Foreign Application Priority Data

Feb. 28, 2017 (JP) .............................. JP2017-037401

(51) Int. Cl.
*G05D 1/00* (2006.01)
*G06K 9/00* (2006.01)
*G07C 5/00* (2006.01)

(52) U.S. Cl.
CPC ......... *G05D 1/0038* (2013.01); *G05D 1/0022* (2013.01); *G05D 1/0088* (2013.01);
(Continued)

(58) Field of Classification Search
CPC .. G05D 1/0038; G05D 1/0022; G05D 1/0088; G05D 2201/0213; G06K 9/00791; G07C 5/008
See application file for complete search history.

(56) References Cited

U.S. PATENT DOCUMENTS 9,507,346 B1* 11/2016 Levinson ............ G05D 1/0291
2006/0089766 A1* 4/2006 Allard ................. G05D 1/0061
701/23
(Continued)

FOREIGN PATENT DOCUMENTS

| JP | 2010-061346 | 3/2010 |
|----|-------------|--------|
| JP | 2016-043747 | 4/2016 |
| JP | 2017-021517 | 1/2017 |

OTHER PUBLICATIONS

International Search Report of PCT application No. PCT/JP2018/005426 dated Apr. 10, 2018.

*Primary Examiner* — Peter D Nolan
*Assistant Examiner* — Peter Y Ning
(74) *Attorney, Agent, or Firm* — Greenblum & Bernstein, P.L.C.

(57) ABSTRACT

In a remote-operation apparatus, a communication circuit receives, from an autonomous vehicle via a network, detection data indicating circumstances of an area around the autonomous vehicle. A display displays an image of the area around the autonomous vehicle generated based on the received detection data. The communication circuit transmits, via the network to the autonomous vehicle that is being remotely operated, a control command including an amount of operation obtained by correcting, based on characteristics of the autonomous vehicle, an amount of operation applied to an operation accepter by a remote operator.

12 Claims, 7 Drawing Sheets

(52) U.S. Cl.
CPC ......... *G06K 9/00791* (2013.01); *G07C 5/008* (2013.01); *G05D 2201/0213* (2013.01)

(56) References Cited

U.S. PATENT DOCUMENTS

| | | | | |
|---|---|---|---|---|
| 2008/0262669 A1* | 10/2008 | Smid | .................... | G05D 1/0278 |
| | | | | 701/23 |
| 2014/0207535 A1* | 7/2014 | Stefan | .................... | G07C 5/008 |
| | | | | 705/7.42 |
| 2016/0139594 A1* | 5/2016 | Okumura | .............. | B60W 30/00 |
| | | | | 701/2 |
| 2016/0216709 A1* | 7/2016 | Schweizer | ........... | G05D 1/0022 |
| 2017/0235315 A1 | 8/2017 | Nakaya et al. | | |

\* cited by examiner

| | Vehicle ID | Tire angle/ steering angle coefficient | Wheelbase (mm) | Tread base (mm) | Vehicle width (mm) | Vehicle length (mm) |
|---|---|---|---|---|---|---|
| Vehicle A | 00001 | 0.05 | 2700 | 1530 | 1760 | 4050 |
| Vehicle B | 00002 | 0.04 | 2800 | 1580 | 1800 | 4200 |
| Vehicle C | 00003 | 0.10 | 3400 | 1650 | 1850 | 4800 |
| Vehicle D | 00004 | 0.08 | 2500 | 1510 | 1730 | 3750 |
| Vehicle E | 00005 | 0.05 | 5300 | 2200 | 2500 | 10400 |
| ⋮ | | | | | | |

321t

REMOTE-OPERATION APPARATUS AND REMOTE-OPERATION METHOD

CROSS REFERENCE TO RELATED APPLICATIONS

This application is a continuation of the PCT International Application No. PCT/JP2018/005426 filed on Feb. 16, 2018, which claims the benefit of foreign priority of Japanese patent application No. 2017-037401 filed on Feb. 28, 2017, the contents all of which are incorporated herein by reference.

BACKGROUND

1. Technical Field

The present disclosure relates to a remote-operation apparatus and a remote-operation method which are used to remotely control an autonomous vehicle.

2. Description of the Related Art

In recent years, there has been acceleration of the development of autonomous vehicles. The development of unmanned vehicles which do not require drivers is also progressing. The unmanned vehicles show promise for application to service vehicles such as taxis, buses, and cargo trucks. However, it is expected to take many years to realize fully autonomous driving defined by the National Highway Traffic Safety Administration (NHTSA) as Level 4. As of 2017, international studies and discussion on legislation are in progress with a stance of allowing unmanned autonomous driving on the condition that remote control from a remote monitoring center is available. Thus, the technology of remote operation is critical in implementing an unmanned autonomous vehicle (for example, refer to Unexamined Japanese Patent Publication No. 2010-061346).

Merely monitoring and operating a single autonomous vehicle by a single remote operator does not contribute to a reduction in labor cost for drivers or a solution of the driver shortage problem. Therefore, it is conceivable that a single remote operator should monitor and operate a plurality of autonomous vehicles. In this case, there may be a situation in which a single remote operator needs to remotely operate, in series, a plurality of vehicles that are different at least in size or in vehicle class.

SUMMARY

A remote-operation apparatus according to one aspect of the present disclosure includes: an operation accepter to be used for remotely operating an autonomous vehicle; a communication circuit; and a display. The communication circuit receives, from the autonomous vehicle via a network, detection data indicating circumstances of an area around the autonomous vehicle. The display displays an image of the area around the autonomous vehicle. The image has been generated based on the received detection data. The communication circuit transmits, via the network to the autonomous vehicle that is being remotely operated, a control command including a second amount of operation obtained by correcting, based on characteristics of the autonomous vehicle, a first amount of operation applied to the operation accepter by a remote operator.

Note that an arbitrary combination of the above structural elements and a method, an apparatus, a system, a computer program, a recoding medium, or the like converted from representation in the present disclosure are also valid as aspects of the present disclosure.

According to the present disclosure, remote operation can be performed without considering a difference between autonomous vehicles.

DETAILED DESCRIPTION OF PREFERRED EMBODIMENTS

Each vehicle has settings of not only the size of the vehicle, but also characteristics related to driving. Manufacturers specify, for each vehicle class, details such as the bend angle and the curve radius of a tire with respect to a steering angle and margins of an accelerator pedal and a brake pedal, for example. Although it is ideal that a remote operator intuitively understand all these characteristics and remotely operate vehicles, driving sensation may become different in actuality. For example, in the case of remotely operating a small commuter car immediately after remotely operating a large bus, the driving sensation is likely to become different.

The present disclosure provides a technique for enabling remote operation without considering a difference between autonomous vehicles.

Figure 1:
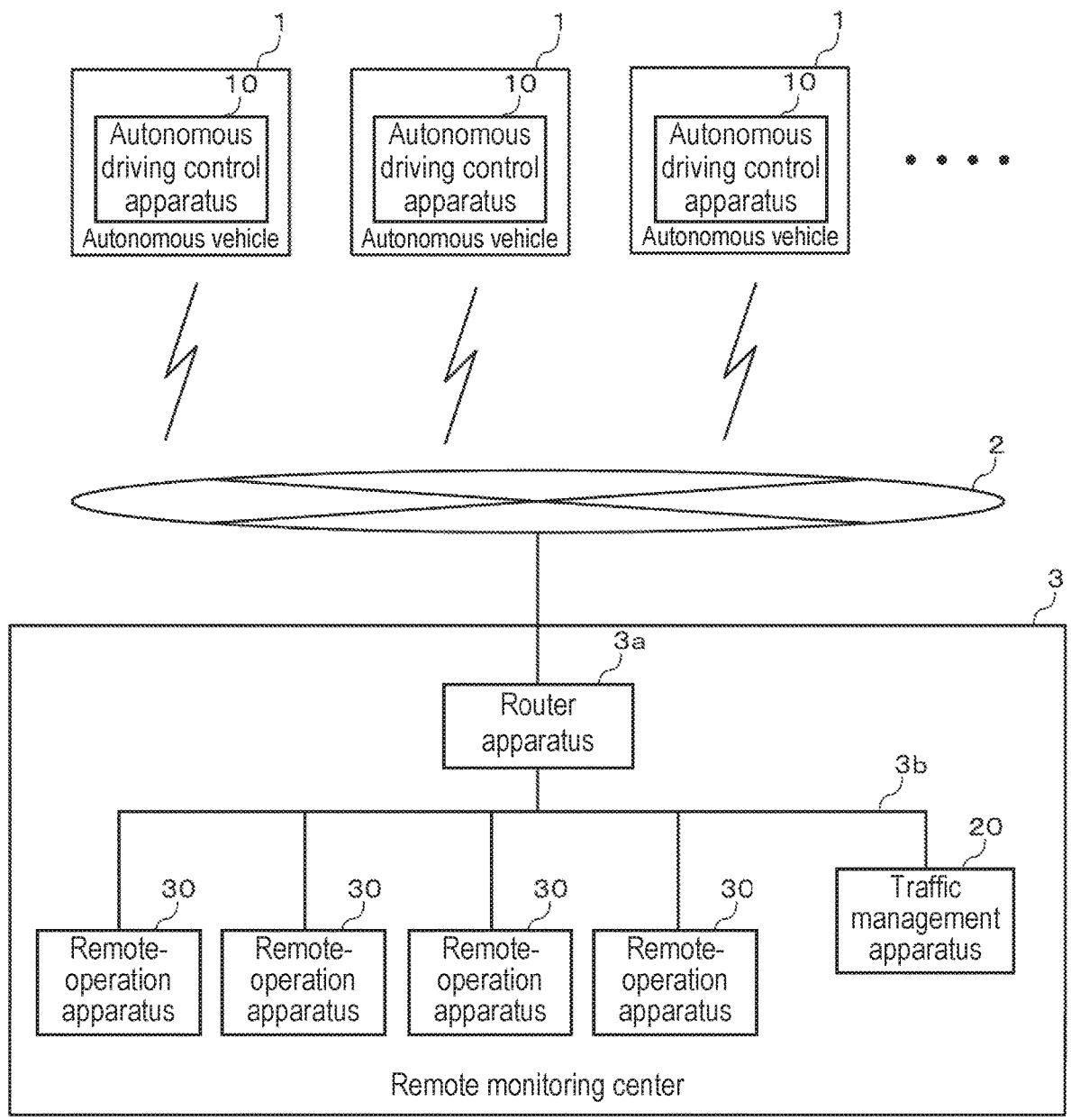
FIG. 1 illustrates the overall configuration of a remote autonomous driving system according to an exemplary embodiment of the present disclosure.

FIG. 1 illustrates the overall configuration of a remote autonomous driving system according to an exemplary embodiment of the present disclosure. The present exemplary embodiment assumes that autonomous vehicle 1 is a service vehicle such as a taxi, a bus, and a cargo truck. Remote monitoring center 3 may take the form of monitoring and controlling autonomous vehicles 1 owned by a single business firm (for example, taxi company A) or may take the form of collectively monitoring and controlling autonomous vehicles 1 owned by two or more business firms (for example, tax company A, taxi company B, bus company C, and delivery company D).

Remote monitoring center 3R is installed with outer apparatus 3a, traffic management apparatus 20, and a plurality of remote-operation apparatuses 30. Traffic management apparatus 20 and the plurality of remote-operation apparatuses 30 are connected over local area network (LAN) 3b and can be connected to Internet 2 via router apparatus 3a.

Each autonomous vehicle 1 includes autonomous driving control apparatus 10. Autonomous driving control apparatus 10 communicates with traffic management apparatus 20 or remote-operation apparatus 30 in remote monitoring center 3 via Internet 2. Note that a dedicated line may be used instead of Internet 2. For example, autonomous driving control apparatus 10 performs bi-directional communication with traffic management apparatus 20 or remote-operation apparatus 30 using a communication scheme (Long-Term Evolution (LTE) or 5th Generation (5G), for example) in which a mobile phone network (cellular network) is involved.

A base station apparatus (not illustrated in the drawings) in the mobile phone network transmits a signal received from autonomous driving control apparatus 10 to traffic management apparatus 20 or remote-operation apparatus 30 via an exchange (not illustrated in the drawings), a gateway apparatus (not illustrated in the drawings), Internet 2, and router apparatus 3a in remote monitoring center 3. Furthermore, the base station apparatus receives, via router apparatus 3a in remote monitoring center 3, Internet 2, the gateway apparatus (not illustrated in the drawings), and the exchange (not illustrated in the drawings), a signal transmitted from traffic management apparatus 20 or remote-operation apparatus 30, and transmits the signal to autonomous driving control apparatus 10. Note that a wireless LAN may be used instead of the mobile phone network. The use of a public wireless LAN can reduce communication costs.

Figure 2:
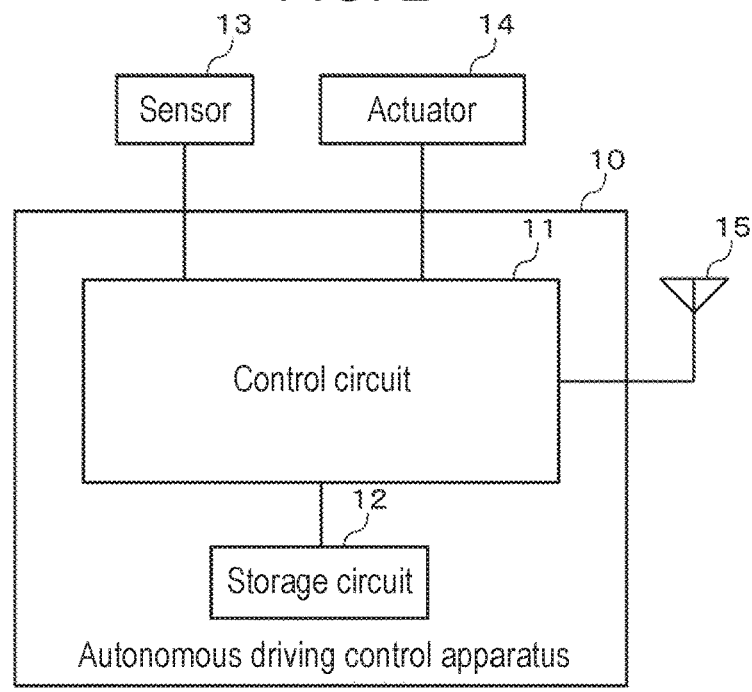
FIG. 2 illustrates the configuration of an autonomous vehicle according to the exemplary embodiment of the present disclosure.

FIG. 2 illustrates the configuration of autonomous vehicle 1 according to the exemplary embodiment of the present disclosure. Autonomous vehicle 1 includes autonomous driving control apparatus 10, sensor 13, actuator 14, and antenna 15. Members that are required for the operation by a driver, such as an accelerator pedal, a brake pedal, and a steering wheel, may be installed in autonomous vehicle 1 or may be omitted.

Actuator 14 is a generic term for members that drive loads related to the travel of vehicles, such as engines, motors, steering, brakes, and lamps. Sensor 13 is a generic term for various sensors that are used to recognize the condition of the user vehicle and the circumstances of the area around the user vehicle. For example, a visible light camera, a light detection and ranging (LIDAR) sensor, a millimeter wave radar, a vehicle speed sensor, an acceleration sensor, and a global positioning system (GPS) sensor are provided as sensor 13. Here, the user vehicle is referred to as the autonomous vehicle which is equipped with autonomous driving control apparatus 10.

The visible light cameras are installed in at least four locations, i.e., on the front, back, left, and right sides of a vehicle, to capture images of the areas ahead, behind, and to the left and right sides of the vehicle. The LIDAR sensor radiates light rays (for example, infrared laser light) to the area surrounding the vehicle, receives reflection signals based on the light rays, and measures, using the received reflection signals, the distance to a target object present in the surrounding area, the size of the target object, and the composition of the target object. The millimeter wave radar radiates electric waves (millimeter waves) to the area surrounding the vehicle, receives reflection signals based on the electric waves, and measures, using the received reflection signals, the distance to a target object present in the surrounding area. The millimeter wave radar is capable of detecting even a target object that is more distant than one detectable with the LIDAR sensor and is difficult to detect with the LIDAR sensor. The vehicle speed sensor detects the speed of autonomous vehicle 1. The acceleration sensor detects the acceleration or the deceleration of autonomous vehicle 1. The global positioning system (GPS) sensor detects the position information of autonomous vehicle 1. Specifically, the GPS sensor receives points in time of transmission from respective GPS satellites, and calculates the latitude and longitude of the receiver position on the basis of the plurality of received points in time of transmission.

Autonomous driving control apparatus 10 includes control circuit 11 and storage circuit 12. Storage circuit 12 is configured with a hard disk drive (HDD) or a solid-state drive (SSD), for example. Storage circuit 12 holds data required for autonomous driving, such as a three-dimensional map. Control circuit 11 can be implemented through cooperation of a hardware resource and a software resource or can be implemented using a hardware resource only. As the hardware resource, a processor, a read-only memory (ROM), a random-access memory (RAM), and other large scale integration (LSI) chips can be used. A central processing unit (CPU), a graphic processing unit (GPU), a digital signal processor (DSP), and the like can be used as the processor. As the software resource, an operating system and a program such as an application can be used.

In accordance with a predetermined autonomous driving algorithm, control circuit 11 causes autonomous vehicle 1 to autonomously travel. Specifically, on the basis of various kinds of detection data obtained by sensor 13 and various kinds of information externally collected over the radio via antenna 15, control circuit 11 recognizes the circumstances of the user vehicle and the area surrounding the user vehicle. Control circuit 11 applies various parameters indicating the recognized circumstances to the autonomous driving algorithm and determines an action of autonomous vehicle 1. On the basis of the determined action, control circuit 11 controls actuator 14.

The autonomous driving algorithm is generated by artificial intelligence (AI) based on deep learning, for example. Various parameters in the autonomous driving algorithm are initially set to values obtained in advance as a result of learning by a high-specification computer, and values updated by a data center on a cloud are downloaded as appropriate.

Control circuit 11 transmits status information to traffic management apparatus 20 via the network. The status information includes position information and a current status of autonomous vehicle 1. The status is classified, for example, as "self-driving (with a load)", "self-driving (without a load)", "standing by in a garage", "being remotely operated", and "being in emergency stop".

An emergency stop represents a stop resulting from autonomous travel becoming impossible, and is made due to events such as a sudden approach of a person, a bicycle, and the like, a sudden stop of a preceding vehicle, cut-in by another vehicle, and a communication failure. The emergency stop is also made when autonomous route setting becomes impossible due to an inspection, an accident, or traffic control for road construction, and the influence thereof. Note that stopping at a red traffic signal, stopping in congestion, and stopping upon arrival at a destination are not included in the emergency stop.

Control circuit 11 transmits the status information to traffic management apparatus 20 via the network regularly or upon a change in the status. Upon a change from the status "self-driving (with a load)" or "self-driving (without a load)" to the status "being in emergency stop", control circuit 11 changes an autonomous driving mode to a remote-operation mode. Note that a remote operator may manually change the mode.

In the remote-operation mode, control circuit 11 transmits data of a video captured by the visible light camera to remote-operation apparatus 30 via the network through streaming. Furthermore, control circuit 11 transmits various kinds of information such as vehicle speed information and obstacle detection information to remote-operation apparatus 30. Control circuit 11 controls actuator 14 in accordance with a control command received from remote-operation apparatus 30 via the network. Also in a mode other than the remote-operation mode, control circuit 11 basically transmits data of a video captured by the visible light camera to remote-operation apparatus 30, but may reduce image quality to reduce the amount of data. Furthermore, in the state where safety is secured, transmission of video data may be omitted.

Figure 3:
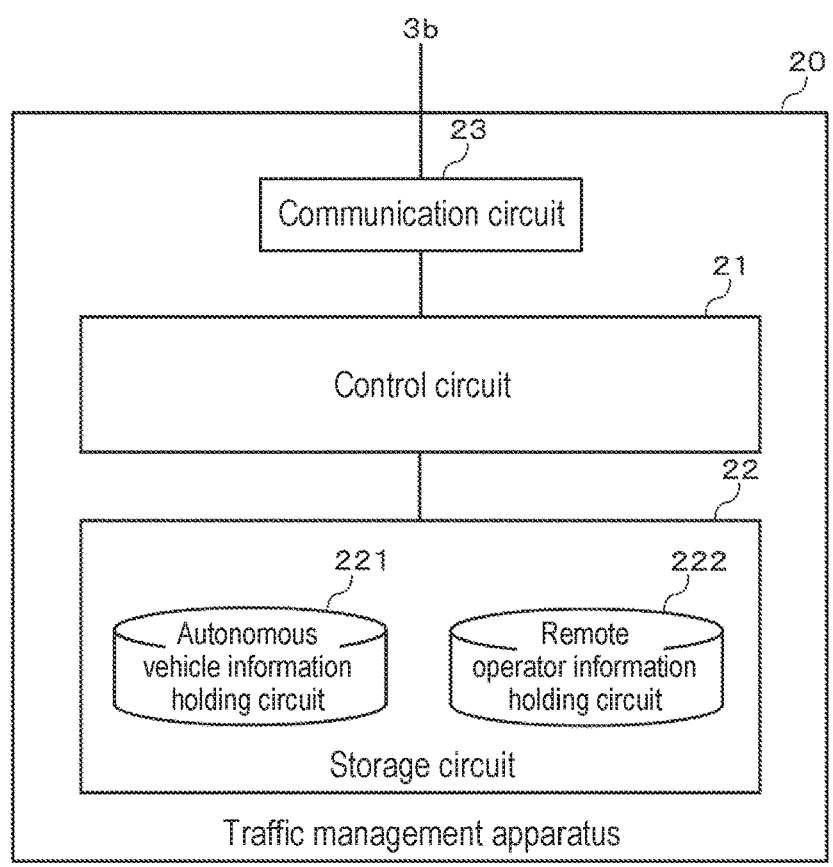
FIG. 3 illustrates the configuration of a traffic management apparatus according to the exemplary embodiment of the present disclosure.

FIG. 3 illustrates the configuration of traffic management apparatus 20 according to the exemplary embodiment of the present disclosure. Traffic management apparatus 20 is formed of at least one server or a personal computer (PC). Traffic management apparatus 20 includes control circuit 21, storage circuit 22, and communication circuit 23. Communication circuit 23 performs predetermined communication processes for communicating with remote-operation apparatus 30 via LAN 3b and with autonomous driving control apparatus 10 via LAN 3b and an external network.

Storage circuit 22 is formed using a hard disk drive (HDD) or a solid-state drive (SSD), for example. Storage circuit 22 includes autonomous vehicle information holding circuit 221 and remote operator information holding circuit 222. Autonomous vehicle information holding circuit 221 holds information of autonomous vehicle 1 which is monitored and controlled by remote monitoring center 3. In the case where one business firm has remote monitoring center 3 set up to monitor and control its own autonomous vehicle(s) 1, autonomous vehicle information holding circuit 221 holds the information of autonomous vehicle(s) 1 owned by the business firm. In the case where remote monitoring center 3 is set up by a third party, autonomous vehicle information holding circuit 221 holds the information of autonomous vehicles 1 owned by each contracted business firm. Remote operator information holding circuit 222 holds information of a remote operator belonging to remote monitoring center 3.

Control circuit 21 can be implemented through cooperation of a hardware resource and a software resource or can be implemented using a hardware resource only. A processor, a ROM, a RAM, and other LSI chips can be used as the hardware resource. A CPU, a GPU, a DSP, and the like can be used as the processor. An operating system and a program such as an application can be used as the software resource.

Control circuit 21 reads, from autonomous vehicle information holding circuit 221, a vehicle management table showing the information of autonomous vehicle(s) 1 that are in service on the day, and reads, from remote operator information holding circuit 222, a remote operator management table showing the information of remote operators who are working on the day. Control circuit 21 updates the vehicle management table in real time on the basis of the status information received from autonomous driving control apparatus 10, thereby manages the status of each of autonomous vehicles 1, reflects the operational status of each of the remote operators to the remote operator management table in real time, and thereby manages the status of each of the remote operators.

At the time when it is necessary to change the autonomous driving mode of one of autonomous vehicles 1 to the remote-operation mode, control circuit 21 refers to the remote operator management table and allocates one of standby remote operators to the one of autonomous vehicles 1. The time when it is necessary to change the autonomous driving mode to the remote-operation mode is the time of a change from the status "self-driving (with a load)" or "self-driving (without a load)" to the status "being in emergency stop".

In the present exemplary embodiment, the number of remote operators who come to work is adjusted so that the number of remote operators who are working on the day is less than the number of autonomous vehicles 1 that are in service on the day. If the number of remote operators is greater than or equal to the number of autonomous vehicles 1, labor cost is not reduced. In addition, it is preferable that the number of remote-operation apparatuses 30 in remote monitoring center 3 be greater than or equal to the number of remote operators who are working on the day. In this case, remote-operation apparatus 30 which each remote operator uses can be fixed, making it easy to manage the remote operators. Each remote operator sits in front of remote-operation apparatus 30 and waits for a remote operation start request from traffic management apparatus 20 while monitoring at least one autonomous vehicle 1 by video or the like.

Figure 4:
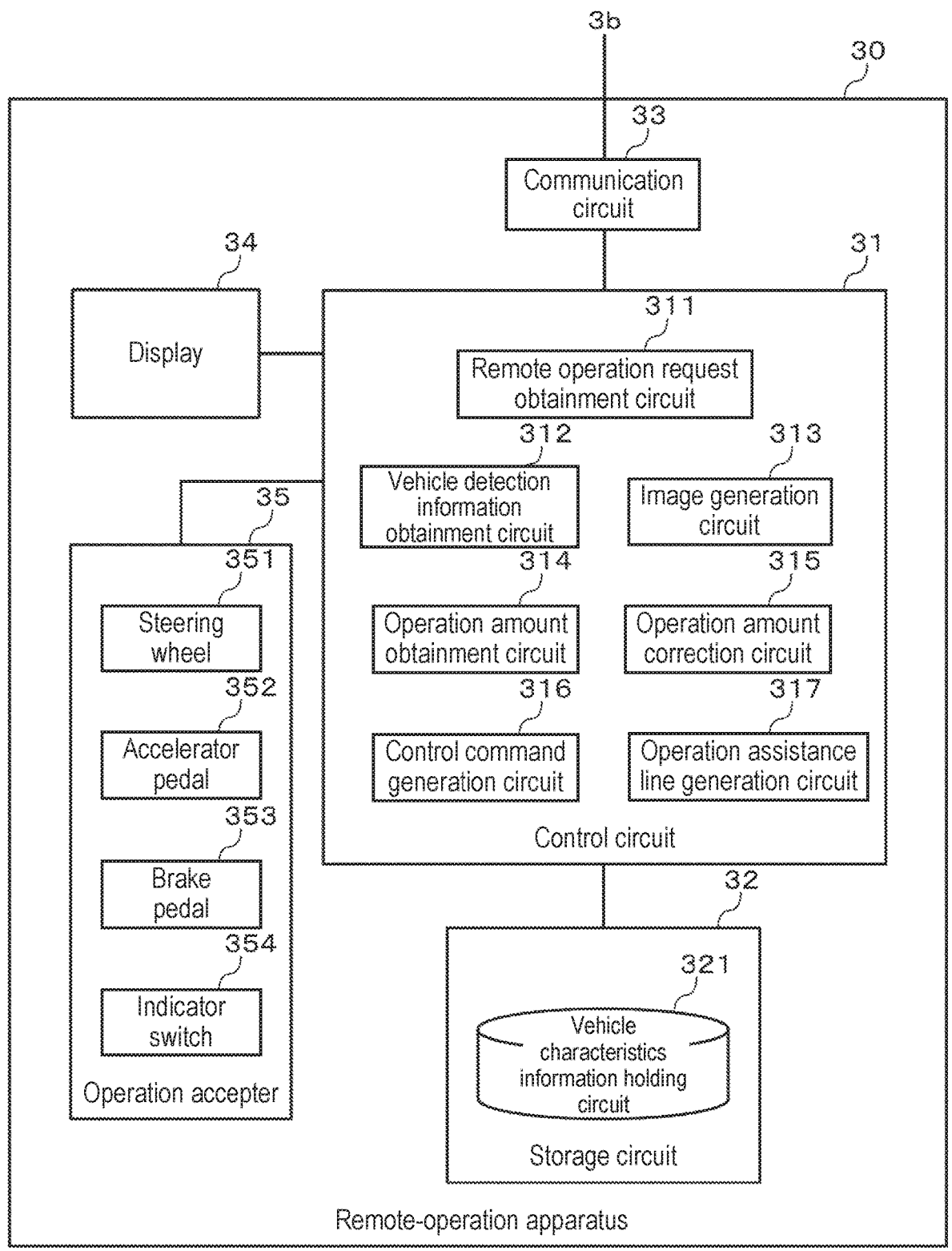
FIG. 4 illustrates the configuration of a remote-operation apparatus according to the exemplary embodiment of the present disclosure.

FIG. 4 illustrates the configuration of remote-operation apparatus 30 according to the exemplary embodiment of the present disclosure. Remote-operation apparatus 30 is formed of a PC, a monitor, and a steering, for example. Remote-operation apparatus 30 includes control circuit 31, storage circuit 32, communication circuit 33, display 34, and operation accepter 35. Communication circuit 33 performs predetermined communication processes for communicating with traffic management apparatus 20 via LAN 3b and with autonomous driving control apparatus 10 via LAN 3b and the external network. Display 34 includes a liquid-crystal display or an organic electroluminescent (EL) display, and displays an image generated by control circuit 31.

Operation accepter 35 includes a steering for remote operation which imitates the steering at the driver seat of autonomous vehicle 1. Specifically, operation accepter 35 includes steering wheel 351, accelerator pedal 352, brake pedal 353, and indicator switch 354. Furthermore, operation accepter 35 may include a gear lever and a meter such as a speed meter and a tachometer. Note that the meter may be displayed on display 34 as an image.

Storage circuit 32 is configured of an HDD or an SSD, for example, and includes vehicle characteristics information holding circuit 321. Vehicle characteristics information holding circuit 321 holds characteristics data of each of autonomous vehicles 1 to be monitored and controlled by remote monitoring center 3. Note that the characteristics data of vehicles may be held separately according to vehicle class.

Figures 5, 6:
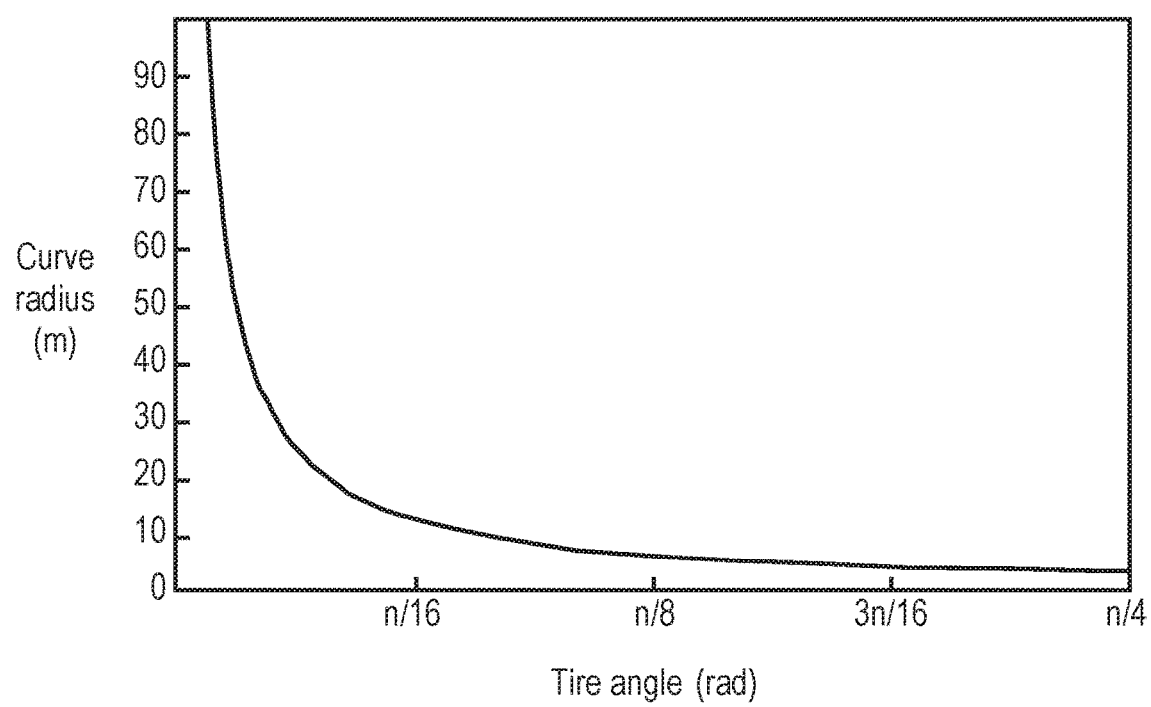
FIG. 5 illustrates an example of a vehicle characteristics table held in a vehicle characteristics information holding circuit.
FIG. 6 is a characteristics graph illustrating a relationship between a tire angle and a curve radius of a vehicle with a wheelbase of 2,500 mm.

FIG. 5 illustrates an example of vehicle characteristics table 321t held in vehicle characteristics information holding circuit 321. In vehicle characteristics table 321t illustrated in FIG. 5, a vehicle ID, a tire angle/steering angle coefficient, a wheelbase, a tread base, a vehicle width, and a vehicle length are managed as items. The tire angle/steering angle coefficient is a value indicating the angle through which a tire moves upon 1-degree rotation of the steering wheel. This value is defined on a per-manufacturer/vehicle class basis and is tuned on the per-manufacturer/vehicle class basis. The wheelbase indicates the distance between a front wheel and a rear wheel. The tread base indicates the distance between the center of the front left wheel and the center of the front right wheel. Note that the tread base, the vehicle width, and the vehicle length are not essential values and can be omitted.

Control circuit 31 in FIG. 4 includes remote operation request obtainment circuit 311, vehicle detection information obtainment circuit 312, image generation circuit 313, operation amount obtainment circuit 314, operation amount correction circuit 315, control command generation circuit 316, and operation assistance line generation circuit 317. The functions of control circuit 31 can be implemented through cooperation of a hardware resource and a software resource or can be implemented using a hardware resource only. A processor, a ROM, a RAM, and other LSI chips can be used as the hardware resource. A CPU, a GPU, a DSP, and the like can be used as the processor. An operating system and a program such as an application can be used as the software resource. Note that such a program may be stored in a non-transitory recording medium and provided. Examples of the recording medium include various recording discs and flash memories.

Remote operation request obtainment circuit 311 obtains selectively the remote operation start request and the remote operation end request from traffic management apparatus 20 via LAN 3b. Upon receiving the remote operation start request, vehicle detection information obtainment circuit 312 establishes a connection channel with autonomous driving control apparatus 10 of autonomous vehicle 1 to be remotely operated, and obtains, via the network, various kinds of detection information obtained by sensor 13 of autonomous vehicle 1. For example, video data captured by the visible light camera, vehicle identification (ID), time information, position information, a vehicle speed, acceleration/deceleration, the orientation of a vehicle body, a road surface condition, and so on are obtained. The orientation of the vehicle body can be detected using a geomagnetic sensor. Alternatively, the orientation of the vehicle body can be estimated by calculating a motion vector of the position information. The road condition may be detected by a camera, a radar, or the like, or an acceleration sensor installed in a tire may detect the road condition on the basis of vibration of tread.

Image generation circuit 313 generates an image on the basis of video data received from autonomous driving control apparatus 10 and causes display 34 to display the image. At this time, for example, a message that reads "The remote operation is ready. Please start the remote operation." may be displayed. When a remote operator sees the message and initiates the control to start the remote operation, autonomous driving control apparatus 10 transitions from the autonomous driving mode to the remote-operation mode.

Operation amount obtainment circuit 314 obtains the amount of operation applied to operation accepter 35 by a remote operator. For example, the steering angle of steering wheel 351, the position of accelerator pedal 352, and the position of brake pedal 353 are obtained. Operation amount correction circuit 315 corrects the obtained amount of operation with reference to vehicle characteristics table 321t.

Control command generation circuit 316 generates a control command including the corrected amount of operation, and transmits the generated control command to autonomous driving control apparatus 10 via the network.

Hereinafter, a specific example of a correction algorithm for correcting the steering angle set for steering wheel 351 will be described. First, the curve radius of autonomous vehicle 1 subject to the remote operation is calculated. Curve radius R of autonomous vehicle 1 can be approximated by Equation (1) or (2) indicated below. Equation (1) is an approximate equation applied when an inner front wheel and an outer front wheel have the same angle, and Equation (2) is an approximate equation applied when the inner front wheel and the outer front wheel have different angles.

$$R = \frac{L}{\sin\alpha} \qquad \text{Equation 1}$$

where L represents the wheelbase and α represents the angle of a front wheel with respect to the straight, forward direction.

$$R = \frac{\frac{L}{\sin\alpha} + \sqrt{\left\{L^2 + \left(\frac{L}{\tan\beta} + Tb\right)^2\right\}}}{2} \qquad \text{Equation 2}$$

where L represents the wheelbase, α represents the angle of an outer wheel with respect to the straight, forward direction, β represents the angle of an inner wheel with respect to the straight, forward direction, and Tb represents the tread base.

Hereinafter, a specific example of correcting the steering angle using Equation (1) indicated above will be described. First, curve radius R resulting from rotation of steering wheel 351 is modelled. The following describes an example where the standard value of wheelbase L is 2,500 mm and the standard value of the tire angle/steering angle coefficient is 0.1.

FIG. 6 is a characteristics graph illustrating the relationship between tire angle θ and curve radius R of a vehicle with wheelbase L of 2,500 mm. The standard value of wheelbase L and the standard value of the tire angle/steering angle coefficient are set, for example, to the value of wheelbase L and the value of the tire angle/steering angle coefficient of the largest number of vehicles among autonomous vehicles 1 that are managed by remote monitoring center 3. Note that the average value, the median, or the like of autonomous vehicles 1 that are managed by remote monitoring center 3 may be used alternatively. The standard value of wheelbase L and the standard value of the tire angle/steering angle coefficient may be held in vehicle characteristics information holding circuit 321 or may be written into a program in advance.

In the following, it is assumed that an example is considered where a remote operator remotely operates vehicle A (refer to FIG. 5), and the remote operator rotates steering wheel 351 of remote-operation apparatus 30 by 100° during remote operation of vehicle A. The standard value of the tire angle/steering angle coefficient is 0.1; thus, tire angle θ is 10° when the steering angle is 100°. Therefore, curve radius R is 14,397 mm (=2,500/sin 10°).

The wheelbase of vehicle A is 2,700 mm, and the tire angle/steering angle coefficient of vehicle A is 0.05. Therefore, tire angle θ of vehicle A with curve radius R of 14,397 mm is approximately 10.8° (sin θ=2,700/14,397). The steering angle with tire angle θ of 10.8° is 216° (=10.8°/0.05). The calculated steering angle (216°) is transmitted to vehicle A via the network. Note that in the case where vehicle A is autonomous vehicle 1 of the type including no steering wheel, corrected tire angle θ (10.8°) is transmitted.

Note that when Equation (2) indicated above is used, more precise correlation between the curve radius and the steering angle can be obtained. Moreover, the steering angle calculated according to Equation (1) or Equation (2) indicated above may be further corrected on the basis of driving properties such as front-engine, front-wheel drive (FF), front-engine, rear-wheel drive (FR), and four-wheel drive (4WD).

Figure 7:
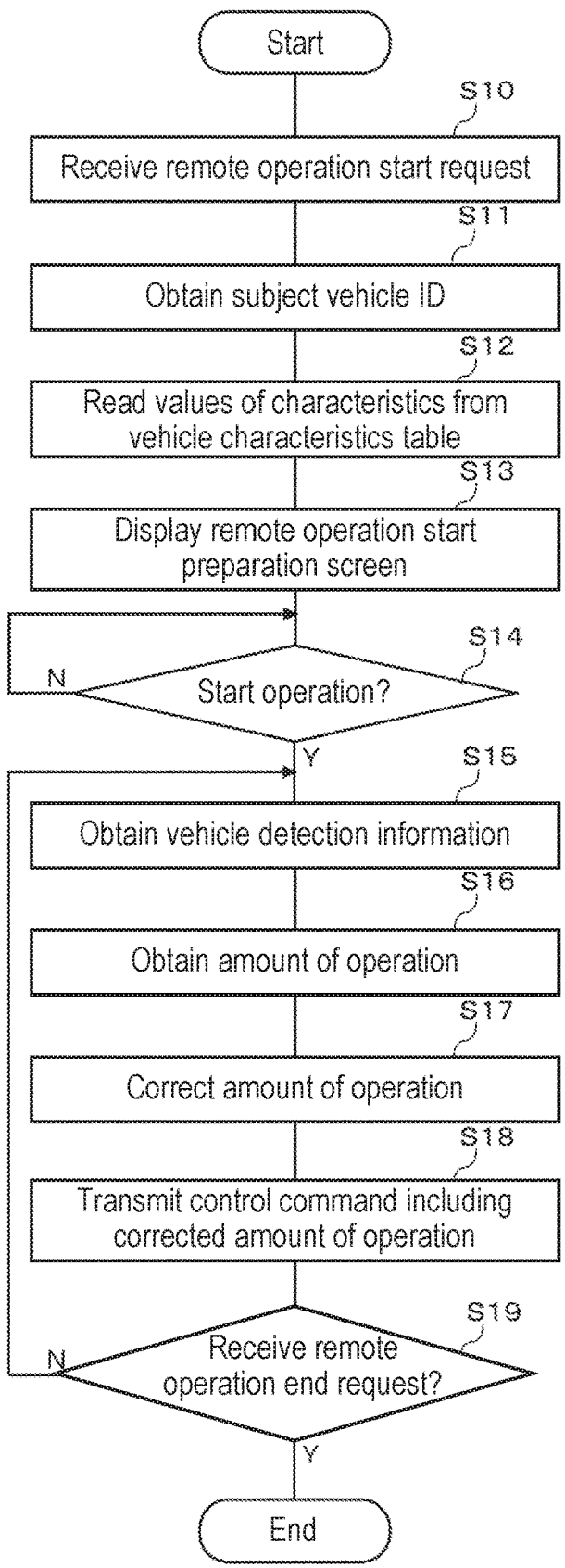
FIG. 7 is a flowchart illustrating operation example A of the remote-operation apparatus according to the exemplary embodiment of the present disclosure.

FIG. 7 is a flowchart illustrating operation example A of remote-operation apparatus 30 according to the exemplary embodiment of the present disclosure. Remote operation request obtainment circuit 311 receives the remote operation start request from traffic management apparatus 20 (Step S10) and obtains vehicle ID of the target to be remotely operated (Step S11). Operation amount obtainment circuit 314 reads, from the vehicle characteristics table held in vehicle characteristics information holding circuit 321, the values of characteristics of the vehicle identified by the vehicle ID (Step S12). In the present exemplary embodiment, the wheelbase and the tire angle/steering angle coefficient of the subject vehicle are read.

Image generation circuit 313 causes display 34 to display an image indicating readiness for starting the remote operation (Step S13). When the remote operator performs the control to start the remote operation (Y in Step S14), the remote operation starts. Note that at the time of the start of the remote operation, a remote operation start signal is transmitted to traffic management apparatus 20.

Vehicle detection information obtainment circuit 312 obtains the vehicle detection information via the network from autonomous driving control apparatus 10 to be remotely controlled (Step S15). Display 34A displays a picture based on the obtained vehicle detection information. Operation amount obtainment circuit 314 obtains the amount of operation applied to operation accepter 35 (Step S16). In the present exemplary embodiment, the steering angle of steering wheel 351 is obtained. Operation amount correction circuit 315 corrects the obtained amount of operation to an operation amount for the subject vehicle (Step S17). In the present exemplary embodiment, the steering angle of the subject vehicle is calculated on the basis of the obtained steering angle, and the wheelbase and the tire angle/steering angle coefficient of the subject vehicle.

Control command generation circuit 316 generates a control command including the calculated operation amount for the subject vehicle, and transmits the control command to autonomous driving control apparatus 10 of the subject vehicle via the network (Step S18). The processing from Steps S15 to S18 is repeatedly performed in a predetermined cycle (for example, the cycle of 10 milliseconds) (N in Step S19) until remote operation request obtainment circuit 311 receives the remote operation end request from traffic management apparatus 20 (Yin Step S19).

Figure 8:
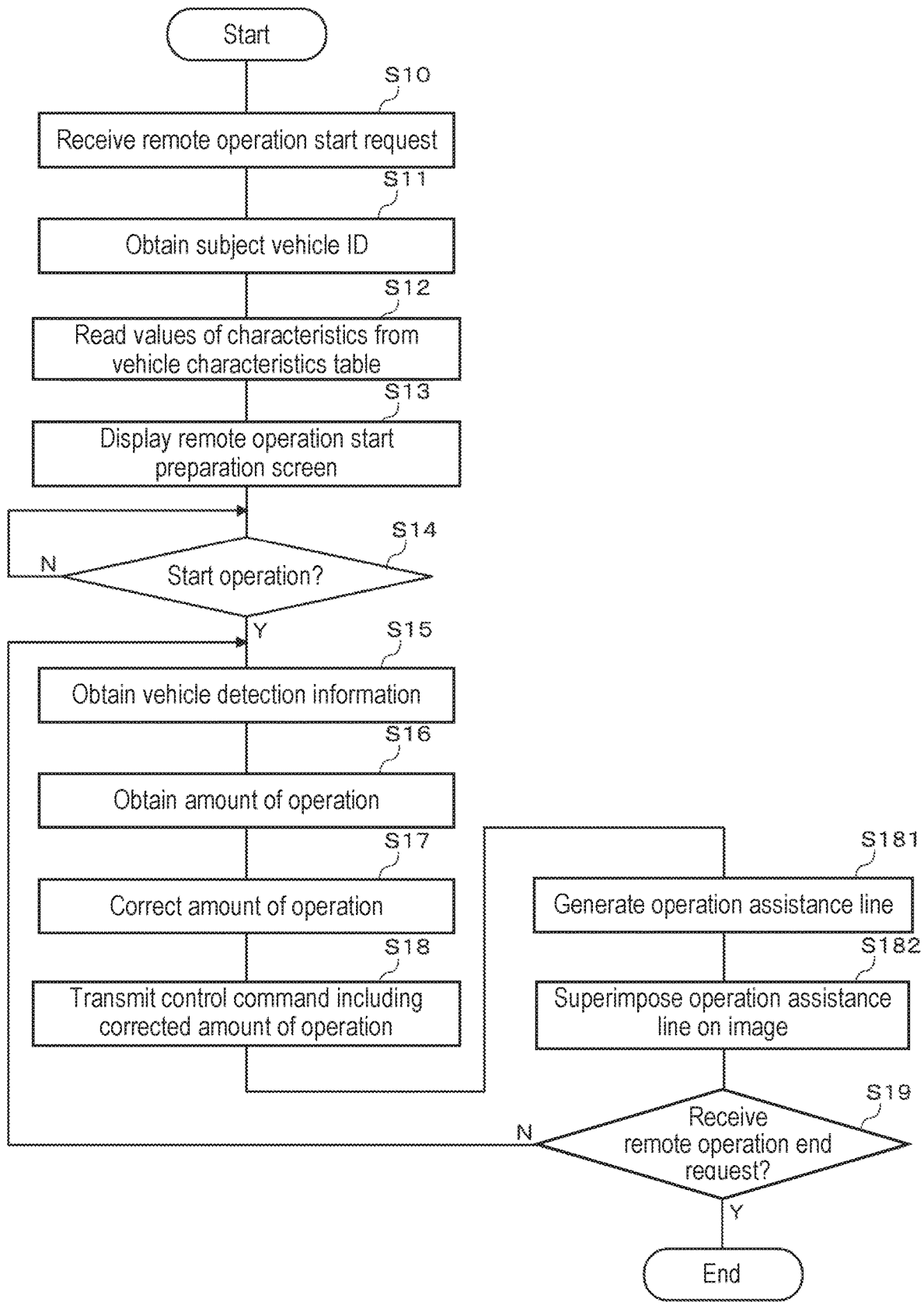
FIG. 8 is a flowchart illustrating operation example B of the remote-operation apparatus according to the exemplary embodiment of the present disclosure.

FIG. 8 is a flowchart illustrating operation example B of remote-operation apparatus 30 according to the exemplary embodiment of the present disclosure. Operation example B is obtained by adding, to operation example A, the process of causing display 34 of remote-operation apparatus 30 to display an operation assistance line as an overlay. The flowchart in FIG. 8 is obtained by adding the processes in Steps S181 and S182 to the flowchart in FIG. 7. Operation assistance line generation circuit 317 of remote-operation apparatus 30 generates the operation assistance line on the basis of the amount of operation corrected by operation amount correction circuit 315 (Step S181). Image generation circuit 313 superimposes the generated operation assistance line on the image for remote operation, and causes display 34 to display the resultant image (Step S182).

Figure 9A:
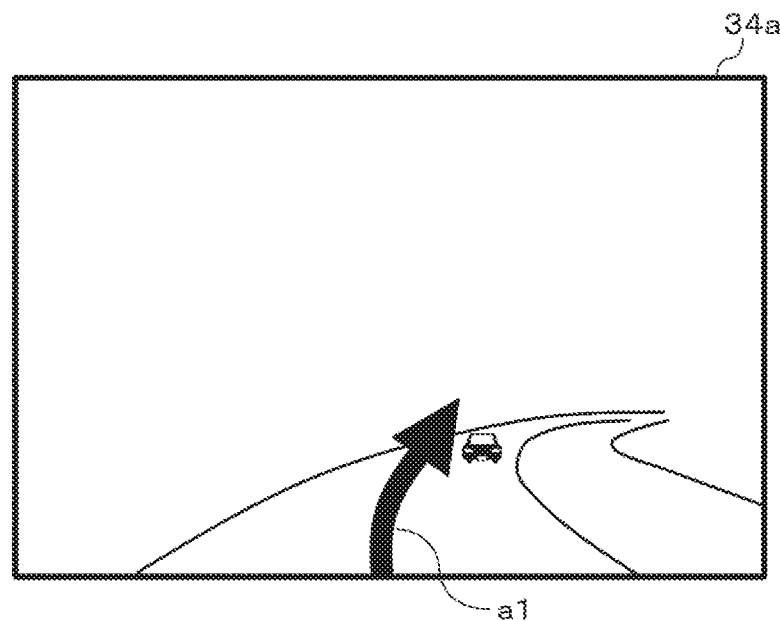
FIG. 9A illustrates an example of an image for remote operation with an operation assistance line superimposed thereon.
Figure 9B:
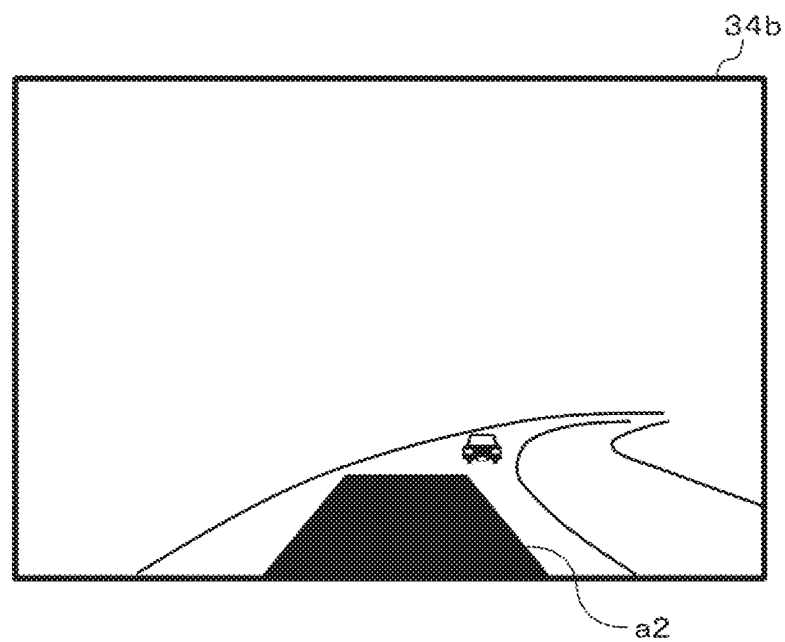
FIG. 9B illustrates another example of an image for remote operation with an operation assistance line superimposed thereon.

FIG. 9A and FIG. 9B each illustrate an example of the image for remote operation with the operation assistance line superimposed thereon. Image 34a illustrated in FIG. 9A is obtained by superimposing, in a central area at the lower end of the screen, assistance line a1 modeling the curve radius obtained at the time of displaying. This curve radius is the curve radius of autonomous vehicle 1 to be remotely operated, and is calculated on the basis of the steering angle of steering wheel 351 of remote-operation apparatus 30, the value of the wheelbase of the subject vehicle, and the tire angle/steering angle coefficient of the subject vehicle. Note that assistance line a1 may be dynamically changed in length according to the vehicle speed or the accelerator position obtained at the time of displaying. For example, the arrow line is long when the vehicle speed is high, and the arrow line is short when the vehicle speed is low. This enables visualization of the sensitivity of steering wheel 351, allowing a remote operator to easily recognize the sensitivity of steering wheel 351.

Image 34b illustrated in FIG. 9B is obtained by superimposing, in the central area at the lower end of the screen, assistance line a2 which reflects the vehicle width and the vehicle length of autonomous vehicle 1 to be remotely operated. The vehicle width and the vehicle length of the subject vehicle can be read from the vehicle characteristics table in vehicle characteristics information holding circuit 321. As with FIG. 9A, assistance line a2 may be dynamically changed in length according to the vehicle speed or the accelerator position obtained at the time of displaying. This allows a remote operator to realize the vehicle width and the vehicle length of the subject vehicle.

As described above, according to the present exemplary embodiment, the amount of operation applied to operation accepter 35 of remote-operation apparatus 30 is corrected according to vehicle characteristics, and thus the vehicle characteristics can be absorbed, enabling remote operation of all vehicles with the same driving sensation and no need to consider a difference between vehicles. Thus, a remote operator can remotely operate even autonomous vehicles 1 belonging to two or more business firms, without different driving sensations. Furthermore, displaying the operation assistance line on the screen for remote operation enables visualization of the current operating condition, and thus the operation by a remote operator can be supported.

The present disclosure has been hereinbefore described by way of the exemplary embodiment. The exemplary embodiment is purely illustrative, and a person skilled in the art will appreciate that various modifications can be made to the combination of the structural elements and the operation processes in the exemplary embodiment and that such modifications are within the scope of the present disclosure.

The above exemplary embodiment describes an example of equalizing effects on vehicle-turning that are produced by turning steering wheels 351 among the plurality of autonomous vehicles 1. In order to equalize effects on acceleration that are produced by stepping on accelerator pedals 352, the type of an accelerator position sensor and the type of a throttle position sensor (in the case of an engine vehicle) need to be registered in the vehicle characteristics table in advance. Operation amount obtainment circuit 314 obtains the position of accelerator pedal 352, and operation amount correction circuit 315 converts the obtained position into a detection value for the accelerator position sensor of the subject vehicle. Furthermore, operation amount correction circuit 315 calculates an opening or closing degree for the throttle position sensor of the subject vehicle according to the vehicle speed and the acceleration. Control command generation circuit 316 transmits the detection value for the accelerator position sensor and the opening or closing degree for the throttle position sensor to autonomous driving control apparatus 10 of the subject vehicle.

In the examples illustrated in FIG. 9A and FIG. 9B, operation assistance line generation circuit 317 may correct the operation assistance line in accordance with the weather/road surface condition at the time of displaying. For example, when it rains or snows, friction coefficient $\mu$ of a road surface is reduced. Operation assistance line generation circuit 317 corrects the operation assistance line so that the curve radius increases as friction coefficient $\mu$ is reduced.

Furthermore, the amount of operation applied to operation accepter 35 may be corrected in accordance with the road surface condition. Operation amount correction circuit 315 corrects the amount of operation so that friction coefficient $\mu$ of a road surface is constant regardless of the weather/road surface condition. Specifically, upon correction, operation amount correction circuit 315 multiplies the obtained amount of operation by the ratio of friction coefficient $\mu$ of an actual road surface with respect to the standard value of friction coefficient $\mu$. Note that the friction coefficient $\mu$ of an actual road surface is estimated from the detection value of the sensor, etc.

Furthermore, operation assistance line generation circuit 317 may correct the operation assistance line in accordance with the degree of aging degradation of the vehicle at the time of displaying. For example, the tires are worn away by aging degradation, and thus friction coefficient $\mu$ is reduced. Operation assistance line generation circuit 317 corrects the operation assistance line so that the curve radius increases as friction coefficient $\mu$ is reduced. The tires are worn away according to a total mileage. Accordingly, it is possible to estimate current friction coefficient $\mu$ of a tire by registering a wear curve of tires of each vehicle with respect to a mileage in the vehicle characteristics table.

Furthermore, the amount of operation applied to operation accepter 35 may be corrected according to the wear condition of the tires. Operation amount correction circuit 315 corrects the amount of operation so that friction coefficient $\mu$ of a tire is constant regardless of the wear condition of the tire. Specifically, upon correction, operation amount correction circuit 315 multiplies the obtained amount of operation by the ratio of friction coefficient $\mu$ of a tire that is estimated from the total mileage with respect to the standard value of friction coefficient $\mu$.

Furthermore, the above exemplary embodiment describes a configuration example in which remote-operation apparatus 30 includes control circuit 31, storage circuit 32, and communication circuit 33, but these functions may be integrated with traffic management apparatus 20. In this case, remote-operation apparatus 30 plays a role as a console terminal, and traffic management apparatus 20 performs multiple tasks for remotely and independently operating the plurality of autonomous vehicles 1.

Furthermore, in the above exemplary embodiment, an example is given in which traffic management apparatus 20 is provided, but traffic management apparatus 20 may be omitted. Specifically, an exemplary embodiment in which autonomous driving control apparatus 10 corresponds one-to-one with remote-operation apparatus 30 is also included in the present disclosure.

Note that an exemplary embodiment may be specified according to items below.

[Item 1]

Remote-operation apparatus 30 includes: operation accepter 35 to be used for remotely operating autonomous vehicle 1; communication circuit 33, and display 34. Communication circuit 33 receives detection data indicating the circumstances of an area around autonomous vehicle 1 from autonomous vehicle 1 via Internet 2, router apparatus 3a, and LAN 3b included in a network. Display 34 displays an image of the area around autonomous vehicle 1. The image has been generated based on the received detection data. Communication circuit 33 transmits, via the aforementioned network to autonomous vehicle 1 that is being remotely operated, a control command including a second amount of operation obtained by correcting, based on characteristics of autonomous vehicle 1, a first amount of operation applied to operation accepter 35 by a remote operator.

With this, a remote operation can be performed without considering a difference between autonomous vehicles 1.

[Item 2]

A plurality of autonomous vehicles 1 including autonomous vehicle 1 that is being remotely controlled may be registered in remote-operation apparatus 30. In addition, communication circuit 33 may be configured to transmit the control command including, as the second amount of operation, an amount of operation corrected so as to make the plurality of autonomous vehicles 1 registered in the remote-operation apparatus have a uniform sensitivity of behavior with respect to the first amount of operation.

This allows a remote operator to remotely operate registered autonomous vehicles 1 with the same sensation.

[Item 3]

Autonomous vehicle 1 to be remotely operated may be allocated to remote-operation apparatus 30 by traffic management apparatus 20 which is configured to manage the status of each of the plurality of autonomous vehicles 1 and the status of each of a smaller number of remote operators than the total number of the plurality of autonomous vehicles 1.

With this, the remote operation of the plurality of autonomous vehicles 1 can be efficiently performed by a small number of remote operators.

[Item 4]

Display 34 may further display an operation assistance line based on the second amount of operation, the operation assistance line being superimposed on the image of the area around autonomous vehicle 1.

With this, the remote operation by a remote operator can be supported.

[Item 5]

In a remote-operation method, detection data indicating circumstances around autonomous vehicle 1 is received from autonomous vehicle 1 via a network. Subsequently, an image of an area around autonomous vehicle 1 generated based on the received detection data is displayed. Furthermore, a control command is transmitted via the network to autonomous vehicle 1 that is being remotely operated. The control command includes a second amount of operation obtained by correcting, based on characteristics of autonomous vehicle 1, a first amount of operation applied to operation accepter 35 of remote-operation apparatus 30 by a remote operator.

With this, a remote operation can be performed without considering a difference between autonomous vehicles 1.

[Item 6]

A plurality of autonomous vehicles 1 including autonomous vehicle 1 that is being remotely controlled may be registered in remote-operation apparatus 30. In addition, when transmitting the control command, the control command may include, as the second amount of operation, an amount of operation corrected so as to make the plurality of autonomous vehicles 1 registered in the remote-operation apparatus have a uniform sensitivity of behavior with respect to the first amount of operation.

This allows a remote operator to remotely operate registered autonomous vehicles 1 with the same sensation.

[Item 7]

Autonomous vehicle 1 to be remotely operated may be allocated to remote-operation apparatus 30 by traffic management apparatus 20 which is configured to manage the status of each of the plurality of autonomous vehicles 1 and the status of each of a smaller number of remote operators than the total number of the plurality of autonomous vehicles 1.

With this, the remote operation of the plurality of autonomous vehicles 1 can be efficiently performed by a small number of remote operators.

With this, the remote operation of the plurality of autonomous vehicles 1 can be efficiently performed by a small number of remote operators.

[Item 8]

An operation assistance line based on the second amount of operation is displayed together with the image of the area around autonomous vehicle 1 when displaying the image of the area around autonomous vehicle 1.

With this, the remote operation by a remote operator can be supported.

Techniques according to the present disclosure are useful in remotely controlling autonomous vehicles.

What is claimed is:

1. A remote-operation apparatus for remotely operating autonomous vehicles, the remote-operation apparatus comprising:
   an operation accepter including at least a steering wheel and configured to receive a first amount of an operation applied by a remote operator;
   a communication circuit configured to receive detection data from each of the autonomous vehicles via a network, the detection data indicating circumstances of an area around each of the autonomous vehicles; and
   a display configured to display an image of the area around at least one of the autonomous vehicles, the image being based on the detection data,
   wherein
   the communication circuit transmits a control command including a second amount of the operation to the at least one of the autonomous vehicles via the network,
   the second amount of the operation being obtained from the first amount of the operation and a respective steering characteristic of each of the autonomous vehicles, and
   the first amount of the operation is received by the steering wheel of the operation accepter.

2. The remote-operation apparatus according to claim 1, wherein the autonomous vehicles are registered in the remote-operation apparatus, and
   the second amount of the operation is obtained by correcting the first amount of the operation with the respective steering characteristic, so as to make the autonomous vehicles registered in the remote-operation apparatus have a uniform sensitivity of behavior.

3. The remote-operation apparatus according to claim 1, wherein the at least one of the autonomous vehicles is allocated to the remote-operation apparatus by a management apparatus which is configured to manage a first status of each of the autonomous vehicles and a second status of each of a smaller number of remote operators than a total number of the autonomous vehicles.

4. The remote-operation apparatus according to claim 1, wherein the display is configured to further display an operation assistance line based on the second amount of the operation, the operation assistance line being superimposed on the image of the area around the at least one of the autonomous vehicles.

5. The remote-operation apparatus according to claim 1, wherein the respective steering characteristic includes at least a tire angle/steering angle coefficient.

6. The remote-operation apparatus according to claim 1, wherein the image is generated based on the detection data.

7. A remote-operation method, comprising:
   receiving a first amount of an operation applied by a remote operator via an operation accepter of a remote-operation apparatus, the operation accepter including at least a steering wheel,
   receiving, with a communication circuit, detection data from each of autonomous vehicles via a network, the detection data indicating circumstances of an area around each of the autonomous vehicles;
   displaying, on a display, an image of the area around at least one of the autonomous vehicles, the image being based on the detection data; and
   transmitting, with the communication circuit, a control command including a second amount of the operation to the at least one of the autonomous vehicles via the network, the second amount of the operation being obtained from the first amount of the operation and a respective steering characteristic of each of the autonomous vehicles, the first amount of the operation received by the steering wheel of the operation accepter.

8. The remote-operation method according to claim 7, wherein the autonomous vehicles are registered in the remote-operation apparatus, and
   the second amount of the operation is obtained by correcting the first amount of the operation with the respective steering characteristic, so as to make the autonomous vehicles registered in the remote-operation apparatus have a uniform sensitivity of behavior.

9. The remote-operation method according to claim 7, further comprising:
   allocating, with a management apparatus, the at least one of the autonomous vehicles to be remotely operated by the remote-operation apparatus, the management apparatus being configured to manage a first status of each the autonomous vehicles and a second status of each of a smaller number of remote operators than a total number of the autonomous vehicles.

10. The remote-operation method according to claim 7, wherein an operation assistance line based on the second amount of the operation is further displayed together with the image of the area around the at least one of the autonomous vehicles when displaying the image of the area around the at least one of the autonomous vehicles on the display.

11. The remote-operation method according to claim 7, wherein the respective steering characteristic includes at least a tire angle/steering angle coefficient.

12. The remote-operation method according to claim 7, wherein the image is generated based on the detection data.

\* \* \* \* \*